(12) United States Patent
Jorgenson

(10) Patent No.: US 7,355,981 B2
(45) Date of Patent: Apr. 8, 2008

(54) SIGNATURE MATCHING METHODS AND APPARATUS FOR PERFORMING NETWORK DIAGNOSTICS

(75) Inventor: Loki Jorgenson, Vancouver (CA)

(73) Assignee: Apparent Networks, Inc., Vancouver, BC (CA)

( * ) Notice: Subject to any disclaimer, the term of this patent is extended or adjusted under 35 U.S.C. 154(b) by 848 days.

(21) Appl. No.: 09/990,381

(22) Filed: Nov. 23, 2001

(65) Prior Publication Data
US 2003/0103461 A1 Jun. 5, 2003

(51) Int. Cl.
*G01R 31/08* (2006.01)
(52) U.S. Cl. .................................. 370/241; 370/252
(58) Field of Classification Search ......... 370/241–253
See application file for complete search history.

(56) References Cited

U.S. PATENT DOCUMENTS

| | | | |
|---|---|---|---|
| 4,551,833 A | 11/1985 | Turner | |
| 5,101,402 A | 3/1992 | Chiu et al. | |
| 5,343,465 A | 8/1994 | Khalil | |
| 5,477,531 A | 12/1995 | McKee et al. | |
| 5,831,972 A * | 11/1998 | Chen | 370/230 |
| 5,838,919 A | 11/1998 | Schwaller et al. | |
| 5,933,416 A * | 8/1999 | Schenkel et al. | 370/254 |
| 5,937,165 A | 8/1999 | Schwaller et al. | |
| 6,061,725 A | 5/2000 | Schwaller et al. | |
| 6,223,207 B1 | 4/2001 | Lucovsky et al. | |
| 6,301,668 B1 | 10/2001 | Gleichauf et al. | |
| 6,754,622 B1 * | 6/2004 | Beser et al. | 704/226 |
| 6,757,255 B1 | 6/2004 | Aoki et al. | 370/252 |
| 6,775,240 B1 * | 8/2004 | Zhang et al. | 370/251 |
| 6,930,982 B2 * | 8/2005 | Jagadeesan | 370/252 |
| 7,072,305 B1 | 7/2006 | Gregson | 370/241 |
| 2002/0080726 A1 * | 6/2002 | Klassen et al. | 370/252 |
| 2003/0218983 A1 * | 11/2003 | Cahn | 370/241 |

OTHER PUBLICATIONS

B. Melander et al., *Probing for Multiple Bandwidth Bottlenecks*, 2002.
A. Pásztor and D. Veitch, *A Precision Infrastructure for Active Probing*, PAM 2001.
K. Lai and M. Baker, *Nettimer: A Tool for Measuring Bottleneck Link Bandwidth*, Apr. 4, 2001, pp. 1-13.
C. Dovrolis, P. Ramanathan and D. Moore, *What do packet dispersion techniques measure?*, InfoCOM'01.
K. Lai and M. Baker, *Measuring Link Bandwidths Using a Deterministic Model of Packet Delay*, InfoCOM'00.
B. Melander, M. Björkman and P. Gunningberg, *A New End-to-End Probing and Analysis Method for Extimating Bandwidth Bottlenecks*, Glodecom 2000.

(Continued)

*Primary Examiner*—Doris H. To
*Assistant Examiner*—Christopher Grey
(74) *Attorney, Agent, or Firm*—Fish & Richardson P.C.

(57) ABSTRACT

A system for identifying problems in networks receives test data which may include statistical information regarding packet loss on a path. The system creates a signature from the test data and compares the signature to example signatures corresponding to various network conditions. The system identifies one or more of the example signatures which match the test signature. The system may comprise an expert system which applies rules to identify an example signature that the test signature best matches.

68 Claims, 5 Drawing Sheets

OTHER PUBLICATIONS

S. Alouf, P. Nain and D. Towsley, *Inferring Network Characteristics via Moment-Based Estimators*, InfoCOM'01.

M. Allman and V. Paxson, *On Estimating End-to-End Network Path Properties*, SIGComm '99.

R.L. Carter and M.E. Crovella, *Measuring Bottleneck Link Speed in Packet-Switched Networks*, Mar. 15, 1996, pp. 1-24.

G. Jin, G. Yang, B.R. Crowley and D.A. Agarwal, *Network Characterization Service (NCS)\**, 2001.

S. Savage, *Sting: A TCP-Based Network Measurement Tool*, 1999, The USENIX Association.

L. Cottrell, *Comparison of some Internet Active End-to-End Performance Measurement Projects*, 1999.

K. Lai and M. Baker, *Measuring Bandwidth*, 1999.

V. Ribeiro et al., *Multifractal Cross-Traffic Estimation*, 2000.

J.G. Cleary and H.S. Martin, *Estimating Bandwidth from Passive Measurement Traces*, 2001.

C. Shannon et al., *Characteristics of Fragmented IP Traffic on Internet Links*, 2001.

J. C. R. Bennett et al., *Packet Reordering is Not Pathological Network Behavior*, 1999.

V. Paxson, *End-to-End Internet Packet Dynamics*, 1997.

A. Erramilli et al., *Experimental Queuing Analysis with Long-Range Dependent Packet Traffic*, 1996.

P. Nain, *Impact of Bursty Traffic on Queues*, 2001.

S. Donnelly et al., *Passive Calibration of an Active Measurement System*, 2001.

P. Barford and M. Crovella, *Measuring Web Performance in the Wide Area*, 1999.

J. Andrén et al., *Understanding End-to-End Internet Traffic Dynamics*, 1998.

S. B. Moon et al., *Correlation of Packet Delay and Loss in the Internet*, 1998.

M. Mathis et al., *The Macroscopic Behavior of the TCP Congestion Avoidance Algorithm*, 1997.

P. Vincent et al., *Measurement-based Performance of Network Elements and Services*, 2001.

V. Ribeiro et al., *Multiscale Queuing Analysis of Long-Range-Dependent Network Traffic*, 2000.

W. Matthews and L. Cottrell, *The PingER Project: Active Internet Performance Monitoring for the HENP Community*, 2000.

M. Yajnik et al., *Measurement and Modelling of the Temporal Dependence in Packet Loss*, 1999.

M. Lucas et al., *Statistical Characterization of Wide-Area Self-Similar Network Traffic*, Oct. 9, 1996.

J. C. Bolot, *Characterizing End-to-End Packet Delay and Loss in the Internet*, 1993.

F. Begtašević and P. Van Mieghem, *Measurements of the Hopcount in Internet*, Nov. 6, 2000.

B. Ryu et al., *Internet Flow Characterization: Adaptive Timeout Strategy and Statistical Modeling*, 2001.

B. Huffaker et al., *Macroscopic Analyses of the Infrastructure: Measurement and Visualization of Internet Connectivity and Performance*, 2001.

L. Cottrell and W. Matthews, *Comparison of Surveyor and RIPE*, Mar. 14, 2000.

J. Cleary et al., *Design Principles for Accurate Passive Measurement*, 2000.

S. Kalidindi and M. J. Zekauskas, *Surveyor: An Infrastructure for Internet Performance Measurements*, Jun. 1999.

S. B. Moon et al., *Estimation and Removal of Clock Skew from Network Delay Measurements*, 1998.

I. Cidon et al., *Analysis of Packet Loss Processes in High-Speed Networks*, 1993.

G. Bianchi et al., *Throughput Analysis of End-to-End Measurement-Based Admission Control in IP*, 2000.

A. J. McGregora et al., *The NLANR Network Analysis Infrastructure*, 2000.

H. Uijterwaal and O. Kolkman, *Internet Delay Measurements Using Test Traffic Design Note*, May 30, 1997.

Koodli, et al. "One-Way Loss Pattern Sample Metrics", Network Working Group, IETF Draft, Request for Comments: 3357, Aug. 2002, 13 pages.

\* cited by examiner

SIGNATURE MATCHING METHODS AND APPARATUS FOR PERFORMING NETWORK DIAGNOSTICS

TECHNICAL FIELD

The invention relates to methods and apparatus for diagnosing conditions in data communication networks. Specific implementations of the invention relate to internet protocol (IP) networks. Aspects of the invention derive diagnostic information from the response of a network to bursts of data packets.

BACKGROUND

A typical data communication network comprises a number of packet handling devices interconnected by data links. The packet handling devices may comprise, for example, routers, switches, bridges, firewalls, gateways, hubs and the like. The data links may comprise physical media segments such as electrical cables of various types, fibre optic cables, and the like or transmission type media such as radio links, laser links, ultrasonic links, and the like. Various communication protocols may be used to carry data across the data links. Data can be carried between two points in such a network by traversing a path which includes one or more data links connecting the two points.

A large network can be very complicated. The correct functioning of such a network requires the proper functioning and cooperation of a large number of different systems. The systems may not be under common control. A network may provide less than optimal performance in delivering data packets between two points for any of a wide variety of reasons including complete or partial failure of a packet handling device, mis-configuration of hardware components, mis-configuration of software, and the like. These factors can interact with one another in subtle ways. Defects or mis-configurations of individual network components can have severe effects on the performance of the network.

The need for systems for facilitating the rapid identification of network faults has spawned a large variety of network testing systems. Some such systems track statistics regarding the behaviors or the network. Some such systems use RMON, which provides a standard set of statistics and control objects. The RMON standard for ethernet is described in RFC 1757. RMON permits the capture of information about network performance, including basic statistics such as such utilization and collisions in real time. There exist various software applications which use RMON to provide information about network performance. Such applications typically run on a computer connected to a network and receive statistics collected by one or more remote monitoring devices.

Some systems send packets, or bursts of packets, along one or more paths through the network. Information regarding the network's performance can be obtained by observing characteristics of the packets, such as measurement of numbers of lost packets or the dispersion of bursts or "trains" of packets as they propagate through the network.

There also exists a number of software network analysis tools that explicitly report network conditions as they are measured or discovered. Other tools compare historical network performance data to currently measured network performance data, and report any changes which are statistically significant.

In order to minimize the time and effort necessary to diagnose problems, attempts have been made to standardize the way in which network malfunctions are described. For example, R. Koodli and R. Ravikanth *One-Way Loss Pattern Sample Metrics* IETF Draft proposes a standard for describing patterns of packet loss. This document suggests a consistent, generalized nomenclature for describing the loss of any packet relative to any other (e.g. concepts of loss distance and loss period), in order to define the distribution of packet losses in a stream of packets over some period of time.

There is a need for tools which are useful in testing network performance and, in cases where the performance is less than optimal, determining why the performance is less than optimal. In general, there exists a need for network diagnostic tools which are capable of facilitating the identification of conditions which may cause data communication networks to exhibit certain behaviors.

SUMMARY OF INVENTION

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention identifies likely network problems which affect data flowing on a path through a network from information regarding the propagation of test packets along the path. The invention may be implemented in software. The software obtains information about various packet behaviors, prepares a test signature from the information and matches the test signature against example signatures associated with specific problems which may affect the network. The software identifies problems which may be afflicting the network based upon which example signatures match the pattern of observed packet behaviors expressed in the test signature.

In general, the test signature is an organized collection of information relating to a number of test packets which have traversed a path in the network. The test signature varies depending upon the way in which the network responds to the test packets. Certain network behaviors can tend to cause test signature to exhibit characteristic patterns. The information to be included in the test signature may be chosen so that different network behaviors cause the test signature to exhibit distinct patterns. The test signature will also vary with features of the particular set of test packets used, such as the sizes of the test packets, the inter-packet spacings, the number of test packets sent, and so on.

Figure 1:
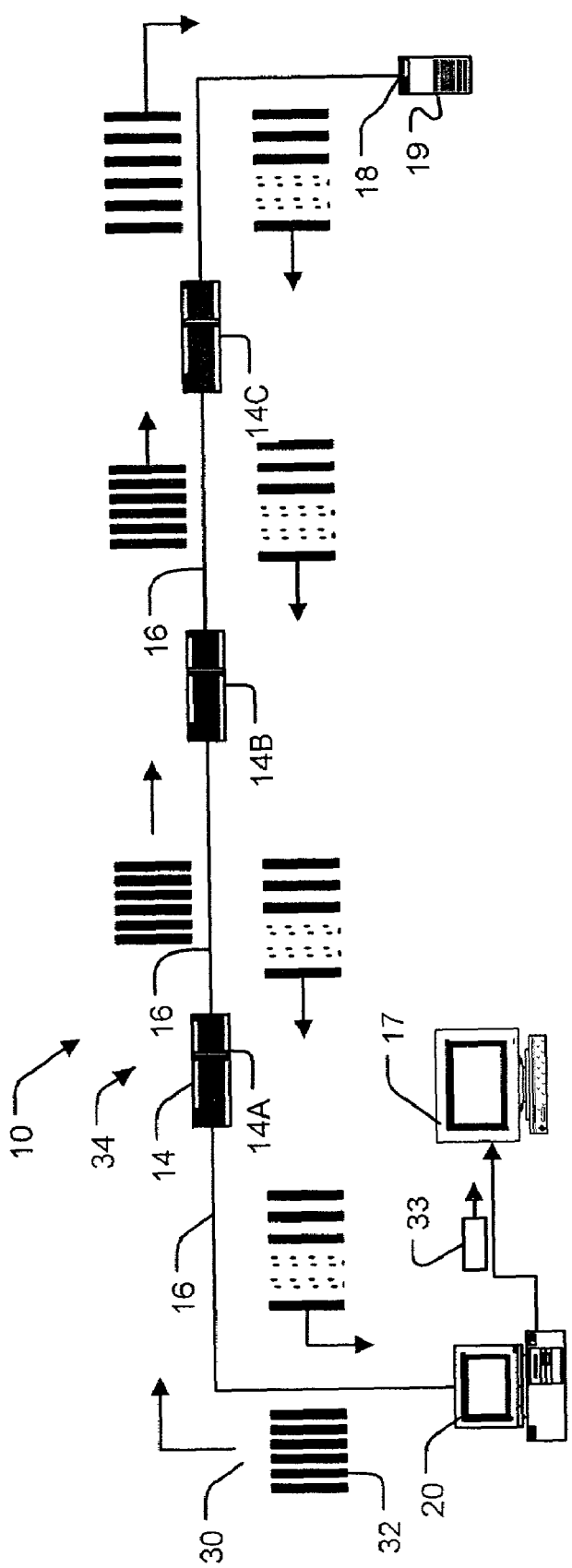
FIG. 1 is a schematic view of a path through a network from a host machine to an end host.

FIG. 1 illustrates a portion of a network 10. Network 10 comprises an arrangement of network devices 14 (the network devices may comprise, for example, routers, switches, bridges, hubs, gateways and the like). Network devices 14 are interconnected by data links 16. The data links may comprise physical media segments such as electrical cables, fibre optic cables, or the like or transmission type media such as radio links, laser links, ultrasonic links, or the like. An analysis system 17 is connected to network 10.

Also connected to network 10 are mechanisms for sending bursts of test packets along a path 34 and receiving the test packets after they have traversed path 34. In the illustrated embodiment, path 34 is a closed loop. Packets originate at a test packet sequencer 20, travel along path 34 to a reflection point 18, and then propagate back to test packet sequencer 20. Path 34 does not need to be a closed loop. For example, the mechanism for dispatching test packets may be separated from the mechanism which receives the test packets after they have traversed path 34.

Test packet sequencer 20 records information about the times at which packets are dispatched and at which returning packets are received.

Figure 2:
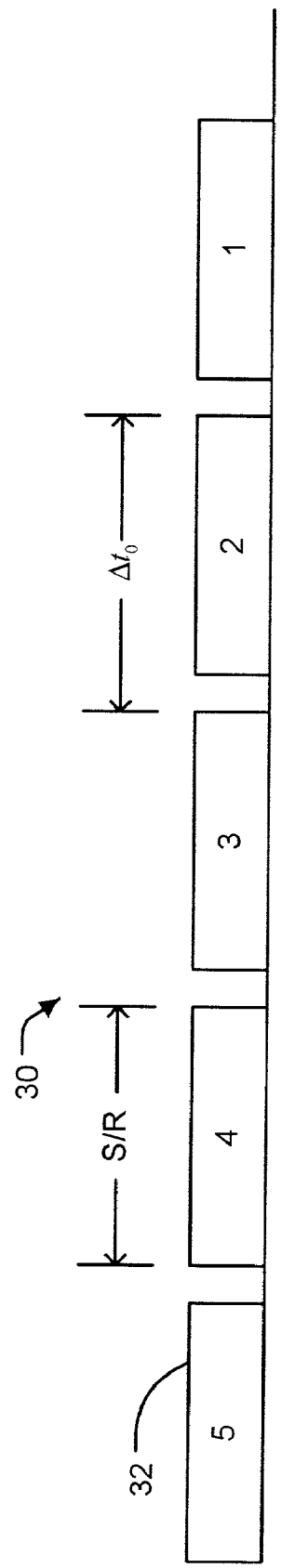
FIG. 2 is an illustration showing the temporal distribution of a burst of packets.

In the illustrated embodiment, a test packet sequencer 20 which dispatches bursts (or "groups" or "trains") 30 each comprising one or more test packets 32 is connected to network 14. As shown in FIG. 2, each packet 32 in a burst 30 has a size S. In an Ethernet network, S is typically in the range of about 46 bytes to about 1500 bytes. The time taken to dispatch a packet is given by S/R and depends upon the rate R at which the packet is placed onto the network. The packets in burst 30 are dispatched in sequence. The individual packets 32 in burst 30 are dispatched so that there is a time $\Delta t_0$ between the dispatch of sequentially adjacent packets 32. In general, S and $\Delta t_0$ do not need to be constant for all packets 32 in a burst 30 although it can be convenient to make S and $\Delta t_0$ the same for all packets 32 in each burst 30.

In the illustrated embodiment, path 34 extends from test packet sequencer 20 through routers 14A, 14B, and 14C to a computer 19 from where the packets are routed back through routers 14C, 14B, and 14A to return to test packet sequencer 20. In this example, path 34 is a closed path. There are various ways to cause packets 32 to traverse a closed path 34. For example, packets 32 may comprise ICMP ECHO packets directed to end host 19 which automatically generates an ICMP ECHO REPLY packet in response to each ICMP ECHO packet. For another example, packets 32 could be another type of packet, such as packets formatted according to the TCP or UDP protocol. Such packets could be sent to end host 19 and then returned to test packet sequencer 20 by software (such as UDP echo daemon software) or hardware at end host 19.

Path 34 could also be an open path in which the test packets 32 are dispatched at one location and are received at a different location after traversing path 34.

As packets 32 pass along path 34 through network devices 14 and data links 16, individual packets 32 may be delayed by different amounts. Some packets 32 may be lost in transit.

Various characteristics of the network devices 14 and data links 16 along path 34 can be determined by observing how the temporal separation of different packets 32 in bursts 30 varies, observing patterns in the losses of packets 32 from bursts 30, or both.

For example, consider the situation which would occur if router 14C has a lower bandwidth than other portions of path 34 and computer 19 has a tendency to lose some packets. These problems along path 34 will result in bursts 30 of packets 32 which return to test packet sequencer 20 being dispersed relative to their initial temporal separation, and having some packets missing. Test packet sequencer 20 provides to analysis system 17 test data 33 regarding the initial and return conditions of burst 30.

Figure 3:
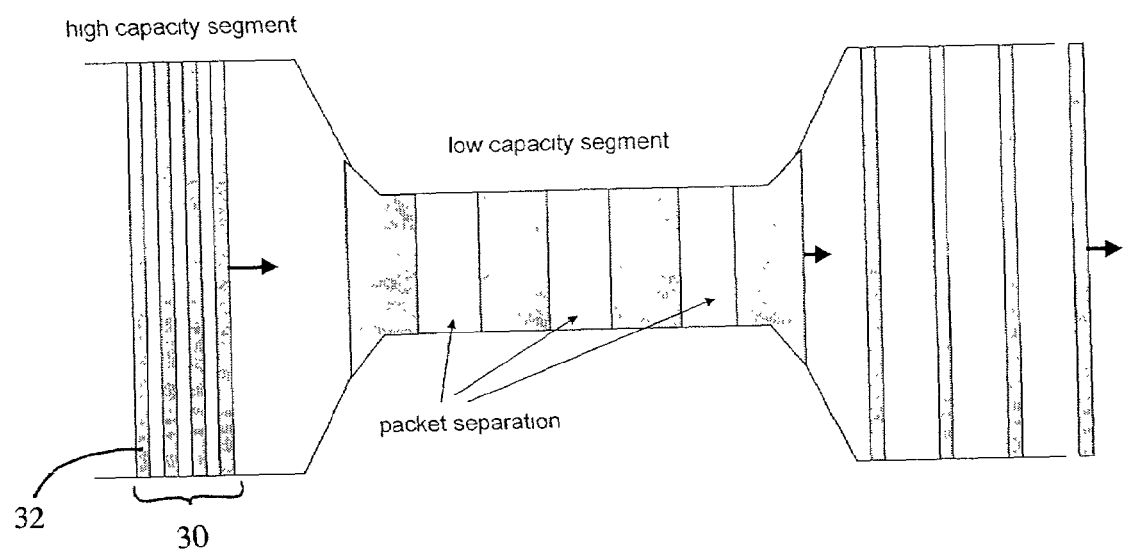
FIG. 3 is a Van Jacobson diagram showing how the distribution of packets in time is modified by variations in the capacities of the network components through which they pass.

FIG. 3 is a Van Jacobsen diagram which demonstrates how the temporal distribution of packets 32 of a burst 30 can change as the packets pass in sequence through lower capacity portions of a network path. A low capacity segment is represented by a narrow portion of the diagram. In this example, a burst of four packets 32 travels from the high capacity segment on the left of the diagram, through the low capacity segment in the middle of the diagram, to the high capacity segment on the right of the diagram. Packets 32 are spread out after they travel through the low capacity segment.

Analysis system 17 receives the test data 33. Analysis system 17 may comprise a programmed computer. Analysis system 17 may be hosted in a common device or located at a common location with test packet sequencer 20 or may be separate. As long as analysis system 17 can receive test data 33, its precise location is a matter of convenience.

Before acquiring test data 33 or while an initial part of test data 33 is being collected, analysis system 17 may coordinate the taking of preliminary tests. The preliminary tests may include an initial connectivity test in which analysis system 17 causes test packet sequencer 20 to send packets along the path to be tested and to detect whether the test packets are received at the end of the path. If no packets travel along the path then test data 33 cannot be acquired for the path and analysis system 17 signals an error.

The preliminary tests may include a test which determines an MTU for the path by dispatching packets of various sizes along the path and determining what is the maximum size of packets that are transmitted by the path. This test may be performed as part of the initial connectivity test. The packet size for the largest packets sent by test packet sequencer 20 while acquiring test data 33 may be equal to the MTU determined in the preliminary tests.

The preliminary tests may also include detecting cases where the initial connectivity test succeeded but substantially all subsequent packets are lost. This can indicate that a network device on the path has become unresponsive.

The preliminary tests may include tests of the time taken by packets to traverse the path. The transit time for one or more packets may be caused to be excessive by unusual routing problems or mis-configuration along the path. When sufficient test data 33 has been acquired to generate a test signature then analysis system 17 can proceed with signature analysis.

Test data 33 comprises information regarding packets which have traversed path 34. This information may include information about lost packets, final inter-packet separation, and information such as hop number, hop address, measured and reported MTU, and error flags. Test data 33 may comprise information about the test sequence including variables such as packet size (number of bytes in a packet), burst size (number of packets in a burst), and initial inter-packet separation (time between packets in a burst at transmission). Test data 33 may also include derivatives of these variables (e.g. packet sequence can be derived from inter-packet separation). Higher order variables may be derived as admixtures of these variables (e.g. a distribution of packet sizes within a distribution of inter-packet separations).

Test data 33 may comprise data from which statistics can be obtained for both datagrams (individual packets—or, equivalently, bursts of length 1) and bursts across a range of packet sizes. Bursts may be treated as a whole, that is, bursts are considered lost when any of their constituent packets are lost or out of sequence. The statistics for the individual burst packets may be gathered separately.

In currently preferred embodiments of the invention, for each packet size, a plurality of bursts of packets are transmitted along the path. Preferably the bursts include bursts having different numbers of constituent packets. Preferably the bursts include both bursts made up of a single packet (datagrams) and other bursts comprising a reasonably large number of packets. For example, the bursts may include bursts having a number of packets ranging from 2 to 100 or more. The number of packets to use is a trade off between choosing a small number of packets to complete testing quickly with a small effect on network traffic or to use a larger number of packets to improve the quality of the resulting measurements. In some typical situations bursts ranging from 8 to 30 packets, provide a good balance with bursts having in the range of 10 to 20 packets being somewhat preferred. In prototype implementations of the invention, bursts of 10 packets have been used to good effect.

Also in the preferred embodiment, test packet sequencer 20 dispatches packets 32 in very closely spaced bursts so that initial inter-packet gaps are much smaller than final inter-packet arrival times. In such cases analysis system 17 may approximate the initial inter-packet gaps as being a small number such as zero.

Analysis system 17 constructs from test data 33 a test signature. The test signature may comprise a set of numbers which are derived from test data 33. In preferred embodiments, the test signature comprises information about packet loss. Packet loss is typically the factor that affects the performance of the network most. The test signature may also comprise information about packet order (in the case of bursts), and intra-burst timing. The nature of the packet loss, ordering and timings may be affected by the circumstances of the network at the time of the test including bottleneck capacity, levels of cross traffic, propagation delay to endhost, size of individual packets, and the number of packets per burst. A signature may be implemented in terms of only the packet loss, and with respect to the packet sizes.

In some embodiments, the test signature is expressed, at least in part, by a number of continuous functions. The functions may include packet loss statistics, round trip time and final inter-packet separation. The signature may also include higher-order functions derived from other functions (e.g. final packet sequence). In some embodiments the test signature is expressed, at least in part by a number of discrete functions which may include discretized continuous functions. This involves taking only a certain number of discrete values as representative of the continuity of possible values. Fixed ranges may be assigned to the variables.

The test signature may combine test data 33 relating to a number of different bursts 30 of packets 32 with the different bursts having different numbers of packets and/or different sizes of packets. In currently preferred embodiments of the invention signatures are based upon test data from a number of kinds of bursts of packets, with the different kinds of bursts including bursts of kinds which have different packet sizes. The bursts may include bursts in which constituent packets are small (for example, the smallest allowable packet size—which may be 46 bytes in an ethernet network, or another size smaller than three times the smallest allowable packet size), other bursts wherein the constituent packets are large (for example, the maximum allowable packet size—which may be 1500 bytes in an ethernet network, or a size in a range of about 90% to 100% of the maximum allowable packet size), and other bursts wherein the constituent packets have a size intermediate the large and small sizes.

In an example embodiment of the invention the test signature comprises a packet loss function which may comprise a ratio of packets received to packets sent; a round trip time which may have an upper limit (any packets received after the round trip time limit are considered lost); and/or a final inter-packet separation (in which all values may be required to be positive when the burst sequence is preserved). In this case, a negative inter-packet separation indicates that the packets in the burst are received out of sequence.

Figure 4:
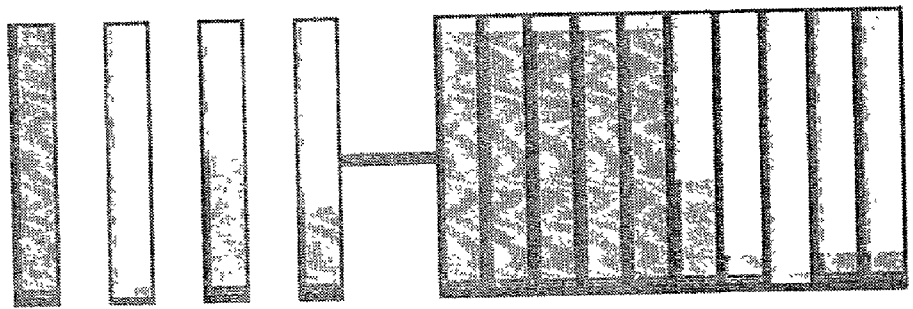
FIG. 4 is a graphical representation of loss ratios for one packet size.

A signature may comprise a two-dimensional matrix comprising acquired statistics for both datagrams and bursts of packets for packets of different sizes. FIG. 4 graphically represents a possible set of packet loss statistics for one packet size. In FIG. 4, each bar represents 100% of the packets sent. The bars correspond (from left to right) to datagrams, bursts, average of burst packets, first moment of burst packets, and individual burst packets for a burst size of 10.

Table 1 is an example matrix which represents a possible test signature. The "Bytes" column indicates the size of the packets in each row. "Dgram" contains packet loss statistics (e.g. the ratio of packets received to packets sent) for datagrams; the burst row contains burst loss statistics (e.g. the ratio of bursts received to bursts sent); the "BrAvg" row contains mean packet loss statistics; the "BrMom" row contains the first moment of packet loss in bursts and the rows labeled "B1"–"B10" contain packet loss statistics for the first through tenth packets in bursts of ten packets.

TABLE 1

| | Test Signature | | |
|---|---|---|---|
| Bytes | 46 | 1000 | 1500 |
| Dgram | .98 | .97 | 1.0 |
| Burst | .91 | .56 | 0.11 |
| BrAvg | .91 | .82 | .39 |
| BrMom | .01 | −.13 | −.28 |
| Burst 1 | 0.89 | 0.85 | 0.91 |
| Burst 2 | 0.91 | 0.88 | 0.87 |
| Burst 3 | 0.93 | 0.8 | 0.3 |
| Burst 4 | 0.88 | 0.78 | 0.21 |
| Burst 5 | 0.94 | 0.67 | 0.34 |
| Burst 6 | 0.87 | 0.85 | 0.41 |
| Burst 7 | 0.9 | 0.71 | 0.22 |
| Burst 8 | 0.91 | 0.62 | 0.32 |
| Burst 9 | 0.87 | 0.59 | 0.46 |
| Burst 10 | 0.89 | 0.77 | 0.21 |

The packet loss ratio may range from 0, indicating all packets lost, to 1, indicating no packets lost. The packet moment may range from −1, indicating strong loss at the end of the burst, to +1, indicating strong loss at the beginning of the burst, with 0 indicating an evenly distributed packet loss (or no significant packet loss).

The mean packet loss and first moment of packet loss are representative of the mean or overall behavior of the individual burst packets and the approximate shape of the distribution of the packets. The mean packet loss may be defined as follows:

$$BrAvg = \frac{\sum_{i=1}^{n} l_i}{n} \quad (1)$$

where n is the number of packets in each burst (n=10 in the example of Table 1) and $l_i$ is the loss ratio for the $i^{th}$ packet in the burst. The first moment of packet loss within bursts may be defined as follows:

$$BrMom = \frac{\sum_{i=1}^{n} i \times l_i}{\sum_{i=1}^{n} l_i} \quad (2)$$

The example signatures may also be represented by matrices similar to that of Table 1 which contain idealized values. Consider as an example, a network that exhibits the following behavior when tested with bursts of packets:

All datagrams (single packet bursts) are received at the end of path 34 (i.e. are returned in the case where path 34 starts and ends at the same location);
All packets within bursts of 10 46 byte packets are returned;
Few bursts of 46 byte packets are lost;
Most packets within bursts of 1000 byte packets return;
Some bursts of 1000 byte packets return;
Some packets within bursts of 1500 byte packets return;
No bursts of 1500 byte packets return; and,
The packets lost from bursts of 1000 and 1500 byte packets tend to be at the ends of the bursts—the last one or two packets in bursts of 1000 byte packets and the last four or five packets in bursts of 1500 byte packets.

Such a behavior can be exemplified by the matrix of Table 2.

TABLE 2

| Bytes | Example Signature | | |
|---|---|---|---|
| | 46 | 1000 | 1500 |
| Dgram | 1 | 1 | 1 |
| Burst | 1 | .1 | 0 |
| BrstAvg | 1 | .85 | .5 |
| BrstMom | 0 | −.25 | −.35 |
| Burst 1 | 1 | 1 | 1 |
| Burst 2 | 1 | 1 | 1 |
| Burst 3 | 1 | 1 | 1 |
| Burst 4 | 1 | 1 | 1 |
| Burst 5 | 1 | 1 | 1 |
| Burst 6 | 1 | 1 | 1 |
| Bust 7 | 1 | 1 | 0 |
| Burst 8 | 1 | 1 | 0 |
| Burst 9 | 1 | 0 | 0 |
| Burst 10 | 1 | 0 | 0 |

Analysis system 17 compares the test signature to example signatures in a signature library which contains signatures exemplifying certain network conditions. The signature library may comprise a data store wherein the example signatures are available in one or more data structures. System 17 may perform the comparison of the test signature to the example signatures by computing a similarity measure or "goodness of fit" between the test signature and the example signatures.

In order to compare the test signature data with the example signatures, some allowance needs to be made for the statistical variance in measurements. Ideally each test signature would be found to exactly match one example signature. This match should ideally be correctly identified despite noise in the test data or the presence of other behaviors.

Each value in the test signature is compared to each value in each of a plurality of example signatures using a goodness of fit metric. The goodness of fit metric may, for example, be obtained by evaluating a function such as:

$$G(x, C, m, \lambda) = \frac{C}{\lambda\sqrt{2\pi}} \exp\left(\frac{-(x-m)^2}{2\lambda^2}\right) \quad (3)$$

where:
C is an importance coefficient in the range [0,1];
x is a value derived from test data 33;
m is an idealized (or "median") value in the range [0,1];
and $\lambda$ is a factor which indicates a degree of tolerance for departure form the idealized value and may be in the range [0, ∞]. A set of values for C and $\lambda$ (or other weighting and/or fitting coefficients) may be associated with each of the example signatures.

Figure 5:
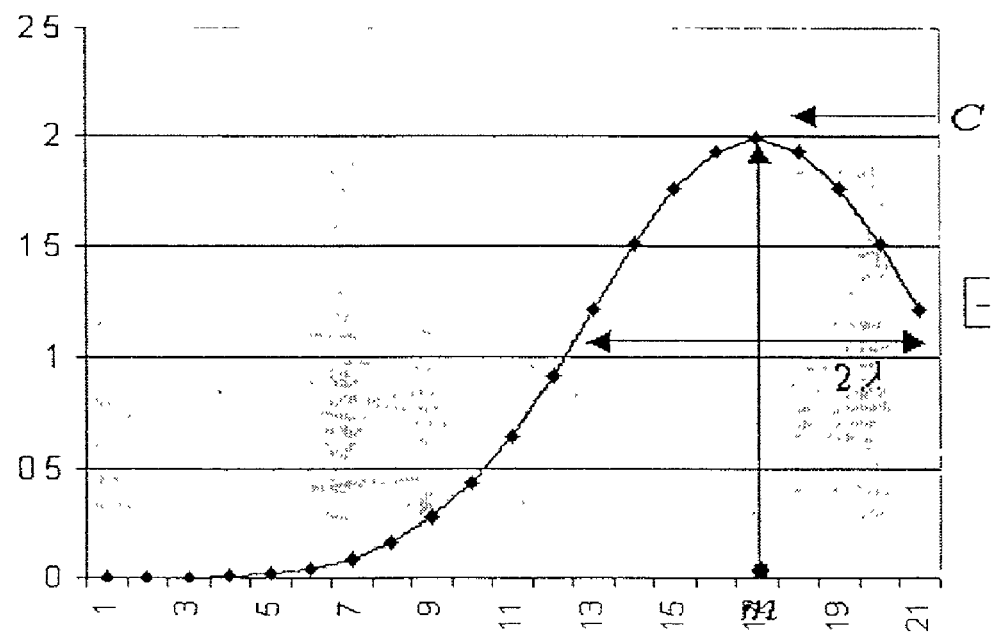
FIG. 5 is a graph of a Gaussian function used in calculation of a goodness-of-fit metric; and, FIG. 6 is a flowchart showing the sequence of steps performed in a method according to an embodiment of the invention.

FIG. 5 is a graph of G as a function of x for a particular choice of (C, m, $\lambda$). The contribution to the fit for a particular statistic depends on where it intersects the function. The maximum value of G occurs at the median m. G decreases with distance from m. G has the form of a Gaussian curve.

In preferred embodiments of the invention, the example signatures each comprise a set of idealized values and each of the idealized values is associated with parameters which specify how the goodness of fit metric will apply to the idealized values. For example, where the goodness of fit metric comprises a Gaussian function G, C and $\lambda$ may be specified for each of the idealized values. The example signatures may comprise a matrix of parameter triplets (C,m,$\lambda$) that can be tuned for an optimal fit to behaviors exhibited by networks with specific problems.

The Gaussian formulation of equation (3) allows for relatively intuitive tuning of signatures. For example, setting C=0.0 for particular values allows those particular values to be ignored in the computation of G. Setting $\lambda$ to a small or large value allows the fit to be tightly or loosely constrained. m sets the idealized value.

Functions such as Chi-squared functions may be used to evaluate goodness-of fit in the alternative to G.

An overall goodness-of-fit between the test signature and an example signature may be obtained, for example, by summing or averaging goodness of fit values computed for each value in the matrix. For example, an overall goodness of fit between a test signature, such as the test signature of Table I and an example signature may be obtained by evaluating an expression such as:

$$FIT = \sum_{all\ sizes} \sum_{all\ values} G(x, C, m, \lambda) \tag{4}$$

The sum of Equation (4) may be normalized for better comparison to the goodness of fit between the test signature and other example signatures. This may be done on the basis of a comparison of the goodness-of-fit of the test signature to the goodness of fit that would be obtained for a lossless network (no packets lost) and the goodness-of-fit that would be obtained if the test signature and example signature were identical. For example, the goodness of fit may be normalized by evaluating:

$$F_{normalized} = \frac{(FIT - F_{no\ loss})}{(F_{match} - F_{no\ loss})} \tag{5}$$

where $F_{normalized}$ is the normalized fit, $F_{no\ loss}$ the goodness of fit that would be obtained in a lossless network and $F_{match}$ is the goodness of fit that would be obtained if the test and example signatures were identical.

The normalized goodness-of-fit measure may be compared to a minimum threshold. The minimum threshold could be, for example, 0.2. If the normalized goodness of fit measure is greater than the minimum threshold then the test signature may be considered to match the example signature. Otherwise the test signature is not considered to match the example signature. The normalized goodness of fit measure may also be compared to a second, larger threshold. The second threshold may be, for example, 0.3. If the goodness of fit measure exceeds the second threshold then the match between the test signature and the example signature may be considered to be a strong match.

The test signature may be compared to example signatures for a number of conditions that could affect the network. For example, the example signatures may include signatures representative of the behavior of a network experiencing conditions such as:

small queues in a network device (packets which arrive while the queue is full are discarded);
 high congestion or a lossy link (which can cause intermittent high packet loss for all types and sizes of packets);
 half duplex/full duplex conflicts (a network device at one end of a data link is in full duplex mode while the network device at the other end of the data link is in half-duplex mode)—separate signatures may represent cases where the upstream network device is in full duplex mode and the downstream network device is in half duplex mode and vice versa;
 inconsistent MTU detected (a network device or data link on the path is using a MTU smaller than the expected MTU);
 long half-duplex link (a half duplex segment comprises an excessively long transmission medium in which collisions between packets can not be properly handled); and,
 media errors (lost packets due to noisy links or media errors which may result in random collisions or dropouts).

The example signatures may be obtained experimentally by configuring a test network to have a specific condition and then observing the behavior of test packets as they pass through the test network, theoretically by making predictions regarding how a network condition would affect sequences of test packets, or both. A non exhaustive sampling of possible example signatures are described below. Of course the precise form taken by an example signature will depend upon the nature of the sequence of test packets to be used among other factors.

Table 3, shows a possible example signature for an overlong half-duplex link condition. This condition is typified by packet collisions, especially during periods of high congestion. This condition can occur when a half-duplex link is longer than a collision domain which on current 10 Mbs links may be about 2000 m and on 100 Mbs may be about 200 m. As can be seen in Table 3, this condition tends to result in greater losses of smaller packets.

TABLE 3

Example Signature - Overlong Half-duplex Link

| Bytes | 46 | 1000 | 1500 |
|---|---|---|---|
| Dgram | 1 | 1 | 1 |
| Burst | .8 | .9 | 1 |
| BrAvg | .6 | .9 | .95 |
| BrMom | −.1 | 0 | 0 |
| Burst 1 | 1 | 1 | 1 |
| Burst 2 | .95 | .95 | .98 |
| Burst 3 | .95 | .95 | .98 |
| Burst 4 | .93 | .95 | .98 |
| Burst 5 | .9 | .95 | .98 |
| Burst 6 | .87 | .95 | .98 |
| Burst 7 | .82 | .95 | .98 |
| Burst 8 | .78 | .95 | .98 |
| Burst 9 | .75 | .95 | .98 |
| Burst 10 | .7 | .95 | .98 |

Table 4, shows a possible example signature for a small buffers condition. This condition is typified by packets being dropped where a volume of data exceeds some established limit. As can be seen in Table 4, this condition tends to result in greater losses of packets at the ends of bursts, bursts of larger packets are affected more than bursts of smaller packets.

TABLE 4

Example Signature - Small Buffers

| Bytes | 46 | 1000 | 1500 |
|---|---|---|---|
| Dgram | 1 | 1 | 1 |
| Burst | 0.8 | .1 | 0 |
| BrAvg | 1 | .85 | .5 |
| BrMom | 0 | −.25 | −.35 |
| Burst 1 | 1 | 1 | 1 |
| Burst 2 | 1 | 1 | 1 |
| Burst 3 | 1 | 1 | 1 |
| Burst 4 | 1 | 1 | 1 |
| Burst 5 | 1 | 1 | 1 |
| Burst 6 | 1 | 1 | 1 |
| Burst 7 | 1 | 1 | .4 |
| Burst 8 | 1 | .9 | .1 |
| Burst 9 | 1 | .4 | 0 |
| Burst 10 | 1 | .1 | 0 |

Table 5, shows a possible example signature for a half-full duplex conflict. This condition can occur where, as a result of a configuration mistake or as a result of the failure of an automatic configuration negotiation two interfaces on a given link are not using the same duplex mode. If the upstream interface is using half duplex and the downstream host is using full duplex then a half-full duplex conflict condition exists. This condition is typified by packets at the beginning of bursts being dropped. This is especially pronounced for larger packet sizes.

TABLE 5

Example Signature - Half-Full Duplex Conflict

| Bytes | 46 | 1000 | 1500 |
|---|---|---|---|
| Dgram | 1 | 1 | 1 |
| Burst | .5 | 0 | 0 |
| BrAvg | .9 | 0.3 | 0.3 |
| BrMom | 0 | 0.5 | 0.7 |
| Burst 1 | 0.8 | 0 | 0 |
| Burst 2 | 0.8 | 0 | 0 |
| Burst 3 | 0.8 | 0 | 0 |
| Burst 4 | 0.8 | 0.1 | 0 |
| Burst 5 | 0.8 | 0.3 | 0 |
| Burst 6 | 0.8 | 0.8 | 0.05 |
| Burst 7 | 0.8 | 0.92 | 0.2 |
| Burst 8 | 0.8 | 1 | 0.7 |
| Burst 9 | 0.9 | 1 | 0.95 |
| Burst 10 | 1 | 1 | 1 |

Table 6, shows a possible example signature for a full-half duplex conflict. This condition can occur where, as a result of a configuration mistake or as a result of the failure of an automatic configuration negotiation two interfaces on a given link are not using the same duplex mode. If the upstream interface is using full duplex and the downstream host is using half duplex then a full-half duplex conflict condition exists. This condition is typified by packets at the ends of bursts being dropped. This is especially pronounced for larger packet sizes.

TABLE 6

Example Signature - Full-Half Duplex Conflict

| Bytes | 46 | 1000 | 1500 |
|---|---|---|---|
| Dgram | 1 | 1 | 1 |
| Burst | .7 | .2 | 0 |
| BrAvg | 1 | .6 | .4 |
| BrMom | 0 | −0.2 | −.5 |
| Burst 1 | 1 | 1 | 1 |
| Burst 2 | 1 | 1 | 1 |
| Burst 3 | 1 | 1 | .9 |
| Burst 4 | 1 | .95 | .8 |
| Burst 5 | 1 | .85 | .3 |
| Burst 6 | 1 | .3 | .2 |
| Burst 7 | 1 | .3 | .2 |
| Burst 8 | 1 | .2 | .2 |
| Burst 9 | 1 | .2 | .2 |
| Burst 10 | 1 | .2 | .2 |

Table 7, shows a possible example signature for a lossy condition. This condition occurs where congestion or a malfunctioning packet handling device causes loss of a certain percentage of all packets. This condition is typified by packets being dropped randomly.

TABLE 7

Example Signature - Lossy Condition

| Bytes | 46 | 1000 | 1500 |
|---|---|---|---|
| Dgram | 0.75 | 0.75 | 0.75 |
| Burst | 0.15 | 0.15 | 0.15 |
| BrAvg | 0.75 | 0.75 | 0.75 |
| BrMom | 0 | 0 | 0 |

TABLE 7-continued

Example Signature - Lossy Condition

| Bytes | 46 | 1000 | 1500 |
|---|---|---|---|
| Burst 1 | 0.75 | 0.75 | 0.75 |
| Burst 2 | 0.75 | 0.75 | 0.75 |
| Burst 3 | 0.75 | 0.75 | 0.75 |
| Burst 4 | 0.75 | 0.75 | 0.75 |
| Burst 5 | 0.75 | 0.75 | 0.75 |
| Burst 6 | 0.75 | 0.75 | 0.75 |
| Burst 7 | 0.75 | 0.75 | 0.75 |
| Burst 8 | 0.75 | 0.75 | 0.75 |
| Burst 9 | 0.75 | 0.75 | 0.75 |
| Burst 10 | 0.75 | 0.75 | 0.75 |

Table 8, shows a possible example signature for an inconsistent MTU condition. This condition occurs where a host or other packet handling device reports or is discovered to permit a certain MTU and subsequently uses a smaller MTU. This condition is typified by packets which are larger than the smaller MTU being dropped.

TABLE 8

Example Signature - Inconsistent MTU

| Bytes | 46 | 1000 | 1500 |
|---|---|---|---|
| Dgram | 1 | 1 | 0 |
| Burst | 1 | 1 | 0 |
| BrAvg | 1 | 1 | 0 |
| BrMom | 0 | 0 | 0 |
| Burst 1 | 1 | 1 | 0 |
| Burst 2 | 1 | 1 | 0 |
| Burst 3 | 1 | 1 | 0 |
| Burst 4 | 1 | 1 | 0 |
| Burst 5 | 1 | 1 | 0 |
| Burst 6 | 1 | 1 | 0 |
| Burst 7 | 1 | 1 | 0 |
| Burst 8 | 1 | 1 | 0 |
| Burst 9 | 1 | 1 | 0 |
| Burst 10 | 1 | 1 | 0 |

Table 9, shows a possible example signature for a media error condition. This condition may result where factors such as poorly seated cards, bad connectors, electromagnetic interference, or bad media introduce stochastic noise into a data link. The signature resembles that for a lossy condition but larger packets are affected more strongly than smaller packets.

TABLE 9

Example Signature - Media Errors

| Bytes | 46 | 1000 | 1500 |
|---|---|---|---|
| Dgram | .9 | .8 | .7 |
| Burst | .75 | .5 | .25 |
| BrAvg | .9 | .8 | .7 |
| BrMom | 0 | 0 | 0 |
| Burst 1 | .9 | .8 | .7 |
| Burst 2 | .9 | .8 | .7 |
| Burst 3 | .9 | .8 | .7 |
| Burst 4 | .9 | .8 | .7 |
| Burst 5 | .9 | .8 | .7 |
| Burst 6 | .9 | .8 | .7 |
| Burst 7 | .9 | .8 | .7 |
| Burst 8 | .9 | .8 | .7 |
| Burst 9 | .9 | .8 | .7 |
| Burst 10 | .9 | .8 | .7 |

Analysis system 17 compares the test signature to a plurality of example signatures. If any of the example signatures match the test signature then analysis system 17 may select the best match. If any of the example signatures match the test signature then analysis system 17 generates a message or signal which identifies for a user or other system one or more of the matching example signatures. The message or signal may comprise setting flags.

When a test signature is found to match one or more example signatures then analysis system 17 may consider additional measures about the network for assistance in establishing which of the example signatures should be identified as the best match. Consideration of the additional measures may be performed by an expert system component.

The additional measures may include measures such as
Measures derived from packet or burst loss statistics (e.g. total bytes per burst returned);
Measures derived from other statistics (e.g. propagation delay relative to some critical threshold);
Relative measures (e.g. a higher match on one signature disallows another signature); and,
Test conditions (e.g. disallow a certain signature if the number of burst packets is set too low).

Some of the additional measures may be based upon information received from sources other than test packet sequencer 20. For example, analysis system 17 may receive ICMP messages from network devices 14. Additional measures may be based upon information in the ICMP messages.

ICMP (Internet Control Message Protocol) is documented in RFC 792. This protocol carries messages related to network operation. ICMP messages may contain information of various sorts including information:
identifying network errors, such as a host or entire portion of the network being unreachable due to some type of failure;
reporting network congestion;
announcing packet timeouts (which occur when a packet is lost—packets which return after a timeout period of, for example, 8 seconds, may be considered lost).

Analysis system 17 may also receive information regarding network topology, maximum transfer unit (MTU) for portions of the network and so on. Analysis system may also receive RMON or SNMP messages.

In some embodiments of the invention, at some point after determining that a test signature matches two or more example signatures, analysis system 17 applies a series of rules to identify one of the example signatures which is the best match. The rules may be based upon additional measures. The rules may be specific to the example signatures which are matched. By applying the rules, analysis system 17 may eliminate one or more matching example signatures or may obtain weighting factors which it applies to the fit values.

Figure 6:
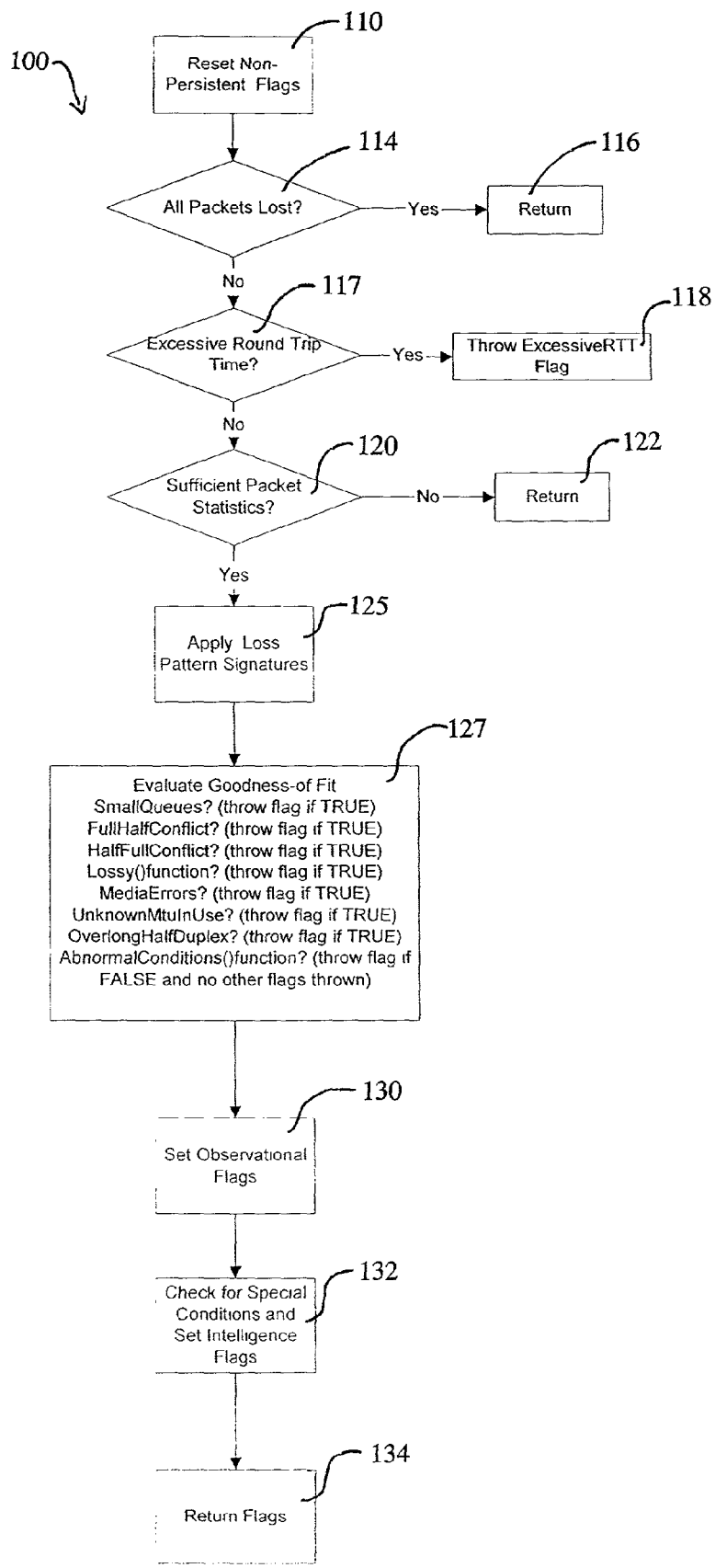

FIG. 6 is a flowchart showing a flow of a method 100 for analyzing test data according to an embodiment of the invention. Method 100 initializes the flags used in this embodiment to indicate matches of test signatures to example signatures in block 110. Blocks 114 through 120 provide several preliminary tests. Block 114 tests for a condition where all packets fail to be received at the end of a path. If so then an error is returned in block 116. If not then, in block 117 the times taken for packets to traverse the path are compared to a threshold. If these times are excessive then a flag is set in block 118 and the method continues at block 120. Otherwise method 100 proceeds to block 120 which determines whether the test data is sufficient to proceed. If not then method 100 returns in block 122. If there is sufficient test data then, a test signature is generated from the test data in block 125. In block 127 the test signature is compared to a plurality of example signatures. The comparison may be made by computing a fit between the test signature and each of the example signatures. In each case where the test signature matches an example signature a flag is set.

In block 130, method 100 sets various observational flags which correspond to observed conditions on the network. The observational flags may include flags which can be set to indicate conditions such as:
Excessive ICMP Network Unreachable messages;
Excessive ICMP Host Unreachable messages;
Excessive ICMP Destination Unreachable messages;
Excessive ICMP Port Unreachable messages;
Excessive ICMP Protocol Unreachable messages;
Excessive ICMP Fragmentation Required messages;
Excessive ICMP TTL Expired messages;
Excessive ICMP Source Quench messages;
Excessive ICMP Redirect messages;
Excessive ICMP Router Advertisement messages;
Excessive ICMP Parameter Problem messages;
Excessive ICMP Security Problem messages;
Excessive unsolicited packets;
Excessive out-of-sequence packets;
Non-standard MTU detected;
'Black Hole' hop;
'Grey Hole' hop; or
Excessive timed out packets.

In block 132 rules are applied to yield conclusions. The conclusions may comprise, for example, an identification of one of the example signatures which the test signature best matches. The rules may be based upon various factors which may include one or more of:
the degree of matching (e.g. the FI) between the test signature and each of the example signatures;
the relative values of the FIT for different ones of the example signatures;
values of observational flags set in block 130; and,
other additional measures.

The rules may comprise individual sets of rules associated with each of the example signatures. The results of applying the individual sets of rules may be used to increase or reduce the FIT value for individual example signatures. For example, where path 34 includes a rate limiting queue, one would expect that the total number of bytes passed for medium packets will be within 10% of the total number of bytes passed for large packets. An individual set of rules associated with the example signature for a rate limiting queue condition could compare the total number of bytes passed for large and medium-sized packets and, if these values are within 10% of one another, significantly increase the FIT associated with the rate limiting queue condition.

After the application of any individual sets of rules, the rules may proceed to make a conclusion regarding the example signature which best matches the test signature (after taking into account any adjustments to the FIT values made by the individual sets of rules).

In block 134, information, which may include a set of flags, is returned. The flags may be provided as input to a user interface which informs a user of conditions affecting the network, saved in a file, and/or, used for further analysis or control of the network or an application which uses the network.

Certain implementations of the invention comprise computer processors which execute software instructions which cause the processors to perform a method of the invention. The invention may also be provided in the form of a program product. The program product may comprise any medium which carries a set of computer-readable signals comprising instructions which, when executed by a computer processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:
- one or more additional measures, such as one or more of the additional measures referred to above may be included in the test and example signatures;
- the test and example signatures may be stored in formats other than as 2-dimensional matrices;

Accordingly, the scope of the invention is to be construed in accordance with the substance defined by the following claims.

What is claimed is:

1. A method for identifying network conditions affecting a computer network, the network having a mechanism for sending packet bursts along a path in the network and receiving said packet bursts at an end of the path, the method comprising:
   providing a plurality of example signatures, each of the example signatures including information indicative of a specific network condition, and at least a part of one or more example signatures indicative of one or more of packet loss, packet ordering and packet timings, wherein each specific network condition causes a unique behavior directly indicative of data transmission performance in the computer network;
   acquiring test data, which test data is based on actual propagation of test packets along the path;
   creating a test signature from the test data, said test signature being an organized collection of information obtained from said test data, and at least a part of said test signature indicative of one or more of packet loss, packet ordering and packet timings, wherein the test signature comprises packet loss statistics for a plurality of positions within bursts of test packets of a first size;
   comparing the test signature to the example signatures; and,
   identifying at least one of the example signatures which matches the test signature according to a match criterion, thereby identifying at least one network condition affecting the computer network.

2. The method of claim 1 wherein comparing the test signature to the example signatures comprises computing a similarity measure between the test signature and each of the example signatures.

3. The method of claim 2 wherein computing a similarity measure comprises performing a chi-squared calculation.

4. The method of claim 2 comprising normalizing the similarity measures corresponding to the example signatures before identifying at least one of the example signatures which matches the test signature.

5. The method of claim 4 wherein normalizing the similarity measures is based at least in part upon the similarity measure that would be obtained in a lossless network.

6. The method of claim 5 wherein normalizing the similarity measures is based at least in part upon the similarity measure that would be obtained if the test signature and example signature were identical.

7. The method of claim 6 wherein normalizing the similarity measures comprises evaluating for each similarity measure:

$$F_{normalized} = \frac{(FIT - F_{no\ loss})}{(F_{match} - F_{no\ loss})}$$

where FIT is the similarity measure, $F_{normalized}$ is the normalized similarity measure, $F_{no\ loss}$ is the similarity measure that would be obtained if the test data reported no loss of packets and $F_{match}$ is the similarity measure that would be obtained if the test signature and example signature were identical.

8. The method of claim 4 comprising adjusting one or more of the similarity measures based upon an individual set of rules associated with that similarity measure before identifying at least one of the example signatures which matches the test signature.

9. The method of claim 8 wherein the individual set of rules includes one or more rules based upon factors including one or more of: a number of ICMP network unreachable messages; a number of ICMP host unreachable messages; a number of ICMP destination unreachable messages; a number of ICMP port unreachable messages; a number of ICMP protocol unreachable messages; a number of ICMP fragmentation required messages; a number of ICMP TTL expired messages; a number of ICMP source quench messages; a number of ICMP redirect messages; a number of ICMP router advertisement messages; a number of ICMP parameter problem messages; a number of ICMP security problem messages; a number of unsolicited packets; a number of out-of-sequence packets; a non-standard MTU detected; and a number of timed out packets.

10. The method of claim 1 wherein
   the test signature comprises a plurality of values,
   each of the example signatures comprise a set of corresponding values and,
   computing the similarity measure between the test signature and an example signature comprises computing a fit between each of the values of the test signature and the corresponding value of the example signature.

11. The method of claim 10 wherein computing a fit between a value of the test signature and a corresponding value of the example signature is performed by evaluating a function associated with the value.

12. The method of claim 10 wherein computing the fit between each of the values of the test signature and the corresponding value of the example signature comprises performing a computation substantially mathematically equivalent to:

$$G(x,m) = A \exp(-B(x-m)^2)$$

where x is a value in the test signature, m is the corresponding value of the example signature and A and B are coefficients.

13. The method of claim 10 wherein computing the fit between each of the values of the test signature and the corresponding value of the example signature comprises performing a computation substantially mathematically equivalent to:

$$G(x, C, m, \lambda) = \frac{C}{\lambda 2\pi} \exp\left(\frac{-(x-m)^2}{2\lambda^2}\right)$$

where x is a value in the test signature, m is the corresponding value of the example signature, and C and λ are coefficients.

14. The method of claim 13 wherein values for C and λ are associated with each corresponding value of the example signature and performing the computation comprises using the values for C and λ associated with the corresponding value of the example signature with which the fit to a value of the test signature is being computed.

15. The method of claim 13 wherein the test signature comprises a mean packet loss for bursts of packets of each of a plurality of sizes.

16. The method of claim 15 comprising determining the mean packet loss, BrAvg substantially as follows:

$$BrAvg = \frac{\sum_{i=1}^{n} l_i}{n}$$

where n is a number of packets in each burst, $l_i$ is the loss ratio for the $i^{th}$ packet in the burst and i is an index which ranges over all of the packets in the burst.

17. The method of claim 1 wherein the test signature comprises, packet loss statistics for a plurality of positions within bursts of test packets of a second size.

18. The method of claim 17 wherein one of the first and second sizes is not more than three times a minimum packet size for the path.

19. The method of claim 18 wherein the other one of the first and second sizes is within 10% of a maximum packet size for the path.

20. The method of claim 17 wherein one of the first and second sizes is within 10% of a maximum packet size for the path.

21. The method of claim 17 wherein the test signature comprises, packet loss statistics for a plurality of positions within bursts of test packets of a third size wherein the third size is intermediate the first and second sizes.

22. The method of claim 17 wherein the test signature comprises a first moment of packet losses within bursts of packets of the first size.

23. The method of claim 17 wherein the test signature comprises a first moment of packet losses within bursts of packets for bursts of packets of each of the first and second sizes.

24. The method of claim 23 comprising determining the first moment of packet losses, BrMom, substantially as follows:

$$BrMom = \frac{\sum_{i=1}^{n} i \times l_i}{\sum_{i=1}^{n} l_i}$$

where $l_i$ is the loss ratio for the $i^{th}$ packet in the burst and i is an index which ranges over all of the packets in the burst.

25. The method of claim 17 wherein the plurality of example signatures comprise example signatures corresponding to two or more of: a small queues condition; a lossy condition; a half-full duplex conflict condition; a full-half duplex conflict condition; an inconsistent MTU condition; a long half-duplex link condition; and a media errors condition.

26. The method of claim 1 wherein the test signature comprises a mean packet loss for bursts of packets of each of a plurality of sizes.

27. The method of claim 26 comprising determining the mean packet loss, BrAvg substantially as follows:

$$BrAvg = \frac{\sum_{i=1}^{n} l_i}{n}$$

where n is a number of packets in each burst, $l_i$ is the loss ratio for the $i^{th}$ packet in the burst and i is an index which ranges over all of the packets in the burst.

28. The method of claim 1 wherein the test signature comprises a first moment of packet losses within bursts of packets of a given size.

29. The method of claim 1 wherein the test signature comprises a first moment of packet losses within bursts of packets for bursts of packets of each of a plurality of sizes.

30. The method of claim 29 comprising determining the first moment of packet losses, BrMom, substantially as follows:

$$BrMom = \frac{\sum_{i=1}^{n} i \times l_i}{\sum_{i=1}^{n} l_i}$$

where $l_i$ is the loss ratio for the $i^{th}$ packet in the burst and i is an index which ranges over all of the packets in the burst.

31. The method of claim 1 wherein the test data includes data regarding the propagation of datagrams along the test path.

32. The method of claim 31 wherein the test signature comprises one or more packet loss statistics for the datagrams.

33. The method of claim 32 wherein the test data comprises information regarding the propagation of datagrams of a plurality of sizes along the test path and the test signature comprises packet loss statistics for datagrams of each of the plurality of sizes.

34. The method of claim 1 wherein the path is a closed path.

35. The method of claim 34 wherein the packets comprise ICMP ECHO packets.

36. The method of claim 34 wherein one or more of the test packets are formatted using TCP protocol or UDP protocol.

37. The method of claim 36 wherein the one or more test packets formatted using TCP or UDP protocol are returned from an end host by software or hardware.

38. The method of claim 36 wherein the test signature comprises packet loss statistics derived from the one or more of the test packets formatted using TCP protocol or UDP protocol.

39. The method of claim 1 wherein the test signature further comprises additional measures.

40. The method of claim 39 wherein the additional measures include one or more of: measures derived from packet or burst loss statistics; measures derived from other statistics relating to propagation of test packets along the path; relative measures; and test conditions.

41. The method of claim 39 wherein the additional measures are based on ICMP messages from network devices along the path, the ICMP messages containing information relating to one or more of: network errors; network congestion; and packet timeouts.

42. The method of claim 39 wherein the additional measures are based on information regarding network topology including one or more of: maximum transfer unit, RMON message; and SNMP message.

43. The method of claim 1 wherein the test data comprises information regarding one or more of: connectivity, maximum transmission unit, network device responsivity; and time for test packets to traverse the path.

44. The method of claim 1 wherein the test data comprises information regarding one or more of: lost packets; final inter-packet separation; hop number, hop address, measured MTU, reported MTU, error flag and information relating to the packet bursts prior to sending along the path.

45. The method of claim 44 wherein the test data comprises information regarding derivatives of said information.

46. The method of claim 1 wherein the test signature comprises one or more functions, the one or more functions relating to one or more of: packet loss statistics; round trip time; and final inter-packet spacing.

47. The method of claim 46 wherein the test signature comprises one or more higher-order functions derived from said one or more functions.

48. The method of claim 1 wherein the path is an open path wherein test packets are sent from one location and received at a different location.

49. The method of claim 48 wherein the test signature comprises packet loss statistics.

50. Apparatus for identifying network conditions affecting a computer network, the network having a mechanism for sending packets in bursts along a path in the network and receiving the packet bursts at an end of the path, the apparatus comprising:

a data store holding a plurality of example signatures, indicative of a plurality of specific network conditions, each of the example signatures including information indicative of a specific network condition, and at least a part of one or more example signatures indicative of one or more of packet loss, packet ordering and packet timings, wherein each specific network condition causes a unique behavior directly indicative of data transmission performance in the computer network;

an input for receiving test data, which test data is based on actual propagation of test packets along the path;

means for creating a test signature from the test data, said test signature being an organized collection of information obtained from said test data, and at least a part of said test signature indicative of one or more of packet loss, packet ordering and packet timings, wherein the test signature comprises packet loss statistics for a plurality of positions within bursts of test packets of a first size;

means for comparing the test signature to the example signatures; and, means for identifying at least one of the example signatures which matches the test signature, wherein said identifying determines at least one of said plurality of specific network conditions which is affecting the computer network.

51. The apparatus of claim 50 wherein the means for identifying at least one of the example signatures which matches the test signature comprises an expert system and a rule base.

52. The apparatus of claim 51 wherein the rule base includes rules which accept as input additional information other than the test signature.

53. The apparatus of claim 52 wherein the additional information comprises one or more of: a number of ICMP network unreachable messages; a number of ICMP host unreachable messages; a number of ICMP destination unreachable messages; a number of ICMP port unreachable messages; a number of ICMP protocol unreachable messages; a number of ICMP fragmentation required messages; a number of ICMP TTL expired messages; a number of ICMP source quench messages; a number of ICMP redirect messages; a number of ICMP router advertisement messages; a number of ICMP parameter problem messages; a number of ICMP security problem messages; a number of unsolicited packets; a number of out-of-sequence packets; a non-standard MTU detected;

and a number of timed out packets.

54. The apparatus of claim 53 wherein the means for comparing the test signature to the example signatures comprises means for calculating a similarity measure between the test signature and each of the example signatures.

55. The apparatus of claim 54 wherein the test signature comprises a plurality of values, each of the example signatures comprise a set of corresponding values and, the means for calculating a similarity measure between the test signature and each of the example signatures comprises means for computing a fit between each of the values of the test signature and the corresponding value of the example signature.

56. The apparatus of claim 54 wherein the means for comparing the test signature to the example signatures comprises a neural network.

57. The apparatus of claim 50 wherein the example signatures comprise example signatures corresponding to two or more of: a small queues condition; a lossy condition; a half-full duplex conflict condition; a full-half duplex conflict condition; an inconsistent MTU condition; a long half-duplex link condition; and a media errors condition.

58. Apparatus for identifying network conditions affecting a computer network, the network having a mechanism for sending packets in bursts along a path in the network and receiving the packet bursts at an end of the path, the apparatus comprising:

a data store holding a plurality of example signatures, indicative of a plurality of specific network conditions, each of the example signatures including information indicative of a specific and different network condition, and at least a part of one or more example signatures indicative of one or more of packet loss, packet ordering and packet timings, wherein each specific network condition causes a unique behavior directly indicative of data transmission performance in the computer network, wherein the example signatures comprise packet loss statistics for a plurality of positions within bursts of test packets of a first size;

an input for receiving test data, which test data is based on actual propagation of test packets along the path;

a test signature creation mechanism configured to create a test signature based upon the test data, said test signature being an organized collection of information obtained from said test data, and at least a part of said test signature indicative of one or more of packet loss, packet ordering and packet timings;

a comparison system configured to derive a similarity measure between a the test signature and each of the plurality of example signatures; and, a selection system configured to identify at least one of the example signatures which best matches the test signature, thereby identifying at least one network condition affecting the computer network.

59. The apparatus of claim 58 comprising a data processor wherein the test signature creation mechanism, comparison system, and selection system each comprise a set of software instructions in a program store accessible to the processor.

60. The apparatus of claim 58 wherein the example signatures comprise packet loss statistics for a plurality of positions within bursts of test packets of a second size.

61. The apparatus of claim 60 wherein the example signatures comprise packet loss statistics for a plurality of positions within bursts of test packets of a third size wherein the third size is intermediate the first and second sizes.

62. The apparatus of claim 61 wherein the example signatures comprise a mean packet loss for bursts of packets of each of a plurality of sizes.

63. The apparatus of claim 61 wherein the example signatures comprise a first moment of packet losses within bursts of packets of a size.

64. The apparatus of claim 61 wherein the example signatures comprise a first moment of packet losses within bursts of packets for bursts of packets of each of a plurality of sizes.

65. The apparatus of claim 61 comprising a test packet sequencer connected to dispatch a sequence of test packets along a network path.

66. The apparatus of claim 65 wherein the test packet sequencer is configured to generate and to dispatch onto the path multiple bursts of ICMP ECHO packets.

67. The apparatus of claim 58 comprising a set weighting coefficients, fitting coefficients, or both weighing and fitting coefficients associated with one or more of the example signatures.

68. A program product comprising a computer readable medium carrying a set of computer-readable signals comprising instructions which, when executed by a computer processor, cause the data processor to execute a method for identifying network conditions affecting a computer network, the network having a mechanism for sending packet bursts along a path in the network and receiving said packet bursts at an end of the path, the method comprising:

providing a plurality of example signatures indicative of a plurality of specific network conditions, each of the example signatures including information indicative of a specific and different network condition, and at least a part of one or more example signatures indicative of one or more of packet loss, packet ordering and packet timings, wherein each specific network condition causes a unique behavior directly indicative of data transmission performance in the computer network;

acquiring test data, which test data is based on actual propagation of test packets along the path;

creating a test signature from the test data, said test signature being an organized collection of information obtained from said test data, and at least a part of said test signature indicative of one or more of packet loss, packet ordering and packet timings, wherein the test signature comprises packet loss statistics for a plurality of positions within bursts of test packets of a first size;

comparing the test signature to the example signatures; and, identifying at least one of the example signatures which matches the test signature according to a match criterion, thereby identifying at least one network condition affecting the computer network.

\* \* \* \* \*

UNITED STATES PATENT AND TRADEMARK OFFICE
CERTIFICATE OF CORRECTION

PATENT NO. : 7,355,981 B2
APPLICATION NO. : 09/990381
DATED : April 8, 2008
INVENTOR(S) : Jorgenson It is certified that error appears in the above-identified patent and that said Letters Patent is hereby corrected as shown below:

Title Page item (56):

Please delete "6,757,255 B1 6/2004 Aoki et al. ...... 370/252" and insert --6,757,255 B1* 6/2004 Aoki et al. ...... 370/252-- therefor;

Please delete "7,072,305 B1 7/2006 Gregson ...... 370/241" and insert --7,072,305 B1* 7/2006 Gregson ...... 370/241-- therefor;

Column 15, Claim 1, Line 44, please delete "signatures," and insert --signatures indicative of a plurality of specific network conditions,-- therefor;

Column 15, Claim 1, Line 46, please insert --and different-- after specific;

Column 15, Claim 1, Line 66, please delete "thereby identifying at least one network condition" and insert --wherein said identifying determines at least one of said plurality of specific network conditions which is-- therefor;

Column 18, Claim 24, Lines 5-9, please delete " $BrMom = \dfrac{\sum\limits_{i=1}^{n} i \times l_i}{\sum\limits_{i=1}^{n} l_i}$ " and insert -- $BrMom = \dfrac{\sum\limits_{i=1}^{n} i \times l_i}{\sum\limits_{i=1}^{n} l_i}$ -- therefor;

Column 19, Claim 50, Lines 59, please delete "signatures," and insert --signatures-- therefor;

Signed and Sealed this
Thirteenth Day of September, 2011

David J. Kappos
*Director of the United States Patent and Trademark Office*

CERTIFICATE OF CORRECTION (continued)
U.S. Pat. No. 7,355,981 B2

Column 19, Claim 50, Line 62, please insert --and different-- after specific;

Column 21, Claim 58, Line 1, please delete "signatures," and insert --signatures-- therefor;

Column 21, Claim 58, Line 26, please delete "thereby identifying at least one network condition" and insert --wherein said selection system identifies at least one of said plurality of specific network conditions which is-- therefor;

Column 22, Claim 68, Line 45, please delete "thereby identifying at least one network condition" and insert --wherein said identifying determines at least one of said plurality of specific network conditions which is-- therefor.